(12) United States Patent
Zengerle et al.

(10) Patent No.: US 8,654,545 B2
(45) Date of Patent: Feb. 18, 2014

(54) ARRANGEMENT AND METHOD FOR HOLDING A PLURALITY OF ELECTRIC CAPACITOR ASSEMBLIES

(75) Inventors: Manfred Zengerle, Ebertsheim (DE); Tobias Leininger, Mannheim (DE)

(73) Assignee: Bombardier Transportation GmbH, Berlin (DE)

( * ) Notice: Subject to any disclaimer, the term of this patent is extended or adjusted under 35 U.S.C. 154(b) by 224 days.

(21) Appl. No.: 13/063,632

(22) PCT Filed: Sep. 17, 2009

(86) PCT No.: PCT/EP2009/006929
§ 371 (c)(1),
(2), (4) Date: Mar. 11, 2011

(87) PCT Pub. No.: WO2010/031594
PCT Pub. Date: Mar. 25, 2010

(65) Prior Publication Data
US 2011/0222261 A1    Sep. 15, 2011

(30) Foreign Application Priority Data
Sep. 19, 2008   (DE) .......................... 10 2008 048 082

(51) Int. Cl.
*H02B 1/01*       (2006.01)
*H01G 4/224*      (2006.01)
*H05K 7/14*       (2006.01)

(52) U.S. Cl.
USPC ............ 361/830; 174/351; 361/522; 361/541

(58) Field of Classification Search
USPC .......... 361/522, 541, 328, 329; 174/258–261, 174/350–354
See application file for complete search history.

(56) References Cited

U.S. PATENT DOCUMENTS

| | | | |
|---|---|---|---|
| 3,808,479 A * | 4/1974 | Mezey | 361/296 |
| 5,278,729 A * | 1/1994 | Hoffman | 361/809 |
| 5,808,858 A * | 9/1998 | Vetter | 361/519 |
| 6,244,544 B1 * | 6/2001 | Kitscha et al. | 248/27.3 |
| 6,265,661 B1 * | 7/2001 | Schweikert et al. | 174/58 |
| 6,327,137 B1 * | 12/2001 | Yamamoto et al. | 361/517 |
| 6,333,091 B1 * | 12/2001 | Kasugai et al. | 428/131 |
| 2008/0068801 A1 * | 3/2008 | Wilk | 361/702 |

FOREIGN PATENT DOCUMENTS

| | | |
|---|---|---|
| CH | 4642 A | 6/1892 |
| DE | 19723455 C1 | 10/1998 |
| DE | 20020121 U1 | 3/2001 |
| DE | 102004007745 B3 | 9/2005 |
| DE | 102006012406 A1 | 9/2007 |
| EP | 0700060 A1 | 3/1996 |
| EP | 1589547 A1 | 10/2005 |

(Continued)

*Primary Examiner* — Zachary M Pape
*Assistant Examiner* — Douglas Burtner
(74) *Attorney, Agent, or Firm* — The Webb Law Firm

(57) ABSTRACT

The invention relates to an arrangement for holding a plurality of electric capacitor assemblies, particularly assemblies having live housings. The arrangement has a carrier having a through-passage for introducing one of the assemblies and further has at least one bearing ring for mounting an assembly. The bearing ring is matched to the dimensions of the through-passage and the assembly such that the assembly when extending through the through-passage, is in contact with the inner edge of the through-passage via the bearing ring, but not in direct contact with the inner edge of the through-passage.

13 Claims, 15 Drawing Sheets

(56) References Cited

FOREIGN PATENT DOCUMENTS

| | | | |
|---|---|---|---|
| JP | 05198457 A | 8/1993 | |
| JP | 05226188 A | 9/1993 | |
| JP | 05283267 A * | 10/1993 | ............... H01G 1/03 |
| JP | 06089832 A | 3/1994 | |
| JP | 06120082 A | 4/1994 | |
| JP | 06236825 A | 8/1994 | |
| JP | 09074042 A | 3/1997 | |
| JP | 2000164465 A | 6/2000 | |
| JP | 2002151345 A | 5/2002 | |

* cited by examiner

ARRANGEMENT AND METHOD FOR HOLDING A PLURALITY OF ELECTRIC CAPACITOR ASSEMBLIES

BACKGROUND OF THE INVENTION

1. Field of the Invention

The invention relates to an arrangement for holding a plurality of electric capacitor assemblies, particularly assemblies having live housings. The invention further relates to a method for holding a plurality of capacitor assemblies. One special aspect of the invention relates to the storage of electrical energy in a battery (that is, an arrangement with a plurality) of capacitor assemblies.

2. Description of Related Art

Capacitors have been used for some years to store electrical energy, particularly the braking energy of railway vehicles. The energy stored in the capacitors can be used, in particular, for the subsequent start-up or acceleration process.

Capacitor assemblies are usually manufactured and offered for sale in housings. In one customary structural shape, the housing is cylindrical and is connected to one of the two electrical potentials of the capacitor or of the plurality of capacitors arranged in the housing. The other potential is connected, for example, to a pin-shaped contact on the front of the housing. The invention also relates to other structural shapes, however.

In particular due to the live housing, the assemblies are usually mounted using plates made of electrically insulating material to be able to arrange a plurality of assemblies next to one another and to make the electrical connection in the manner desired. In particular, the assemblies may be connected electrically in series and/or in parallel.

The expenditure for manufacturing the insulating plates and for mounting the assemblies to the insulating plates is relatively high. A carrier to mount a plurality of capacitor assemblies would be beneficial where the carrier can be manufactured from any material, in particular, optionally of plastic or metal. Metal provides great stability and durability.

Consequently, it is the object of this invention to specify an arrangement and a method of the type cited at the beginning for holding a plurality of capacitor assemblies regardless of whether the capacitor assemblies are live around the circumference of their housing or not.

SUMMARY OF THE INVENTION

Using a carrier that provides a through-passage for each of the capacitor assemblies to be held on the carrier is proposed. The individual assemblies are arranged on the carrier such that they extend through the through-passage. In this respect, the assemblies are each combined with a bearing ring used to make contact with the inside edge of the through-passage. The bearing ring is a ring-shaped member used to mount the assembly in the through-passage. In this way, the outer circumference of the assembly does not make direct contact with the inside edge of the through-passage but rather only indirectly by way of the bearing ring. The bearing ring can, for example, be made of an electrically insulating material, for example, polypropylene or polyamide. Other electrically insulating materials may also be used. If the outer circumference of the assembly is not live, however, a bearing ring made of metal or another electrically conducting material may also be used. In all of these cases, the material of the carrier, for example, a plate-shaped carrier with a plurality of through-passages arranged next to one another, can be any material, for example, metal. The bearing ring, for example, running around the inside edge of the through-passage around the outside circumference of the assembly, allows simple installation of the assembly in the through-passage and also prevents, as mentioned, direct mechanical contact between the assembly in the carrier.

In particular, the following is proposed: An arrangement for holding a plurality of electric capacitor assemblies, particularly assemblies having live housings wherein the arrangement has the following:

a carrier with a through-passage to insert each of the assemblies, at least one bearing ring for mounting one assembly wherein the bearing ring is matched to the dimensions of the through-passage and of the assembly so that the assembly, when extended through the through-passage, makes contact with the inside edge of the through-passage by way of the bearing ring but is not directly in contact with the inside edge of the through-passage.

In addition, a method for holding a plurality of electric capacitor assemblies is proposed, particularly assemblies having live housings wherein to install the assemblies:

one assembly in each case is inserted into one of the through-passages of a carrier having a plurality of through-passages such that the assembly extends through the through-passage, before, during and/or after insertion of the assembly in the through-passage, a bearing ring is inserted in the through-passage so that it is arranged between the outside circumference of the assembly and the inside edge of the through-passage and holds the assembly to the carrier as soon as installation has been completed so that the assembly makes contact with the inside edge of the through-passage by way of the bearing ring but is not directly in contact with the inside edge of the through-passage.

Developments of the method result from the following description of developments of the arrangement and from the included patent claims.

In one preferred development, the arrangement has a clamp ring that extends, when the assembly is installed, between the outside circumference of the assembly and the material of the carrier in such a way that the assembly, the clamp ring and the bearing ring are held to the inside edge of the through-passage by clamping action.

Holding the assembly by means of clamping action simplifies installation and still provides a reliable holding connection between the assembly and the carrier. In particular, one clamp ring is provided for every through-passage in which an assembly is held.

In a particular development, an axial direction is defined by the through-passage and extends from one side of the carrier through the through-passage to the opposite side of the carrier wherein the arrangement is designed such that the clamp ring is to be moved in the axial direction to generate the clamping action to install the assembly. Preferably, the clamp ring has a first thread and the bearing ring has a second thread that work together in such a way that, using a screwing motion of the bearing ring and/or of the clamp ring, the clamp ring is moved in the axial direction and, in this way, is brought into an axial position in which the clamp ring generates the clamping action. However, other embodiments are also possible in which the axial motion of the clamp ring is effected in some other manner. For example, the bearing ring may not have a thread and the mating thread is formed on the inside edge of the through-passage or on the outside circumference of the assembly.

In addition, the thread need not absolutely be formed on the clamp ring. Rather, for example, an axial movement that results in the generation of the clamping effect by the clamp ring using an appropriate screwing motion can be effected by the formation of mating threads on at least two of the following parts: carrier, bearing ring, assembly, some additional part.

The clamp ring, for example, has members running parallel to the axial direction that taper in size in the radial direction along their length. These members can interact with corresponding sections of the bearing ring to develop the clamping action with a relative axial motion of the bearing ring and the clamp ring. The tapering members of the clamp ring, however, need not absolutely interact with sections of the bearing ring specially designed for the clamping action. Rather, these sections of the clamp ring may also interact with the housing, some additional component of the arrangement and/or the inside edge of the through-passage. Furthermore, the sections of a single member tapering in the axial direction can be formed, for example, by a ring-shaped portion of the bearing ring.

For example, the through-passage may be a circular opening, that is, the opening may have a circular cross-section. Particularly in this case, the capacitor held in the through-passage may unintentionally rotate. For this reason, the following is preferably proposed: At least one recess extending in the radial direction is arranged on the inside edge of the through-passage wherein the bearing ring has a projection extending outward in the radial direction and wherein the projection engages in the recess in such a way that the bearing ring is secured against a rotational movement in the circumferential direction of the edge of the through-passage.

The bearing ring preferably extends in the axial direction over a length greater than the length of the through-passage. In this manner, holding the assembly in the through-passage can be further stabilized.

Furthermore, it is possible that the dimensions of the bearing ring in the axial direction are designed so that a subsection of the bearing ring can be inserted into the through-passage or the ring can even be moved through the through-passage but another subsection of the bearing ring has a larger cross-section than the through-passage or is at least wider than the through-passage so that the other subsection cannot be inserted into the through-passage. In this way, the holding connection of the assembly is additionally stabilized on the carrier. When using a clamp ring, in addition, the subsection of the bearing ring that was moved through the through-passage can be pressed radially outward as the clamping action develops so that this subsection is secured against being moved back again unintentionally in an axial direction through the through-passage.

Preferably, the assembly or the plurality of assemblies is held in one through-passage of the carrier via a bearing ring not just on one end but rather on a second section located at some distance in the axial direction. Consequently, the assembly is mounted in a particularly secure and permanent manner. Particularly, it is proposed that the arrangement have a second carrier with at least a second through-passage to insert an assembly wherein the assembly, when installed, extends through one of the through-passages in the first carrier and, in another section located at some distance in the axial direction from the first carrier, through the second through-passage and is held in the second through-passage by means of a second bearing ring.

The invention further relates not only to the arrangement for holding a plurality of capacitor assemblies but also to such an arrangement where the capacitor assemblies are in fact present. In particular, this can include an energy storage device for storing electrical energy in the various capacitor assemblies.

BRIEF DESCRIPTION OF THE DRAWINGS

Exemplary embodiments of the invention are now described with reference to the accompanying drawing. The individual figures of the drawing are as follows.

DETAILED DESCRIPTION OF THE PREFERRED EMBODIMENTS

Figure 1:
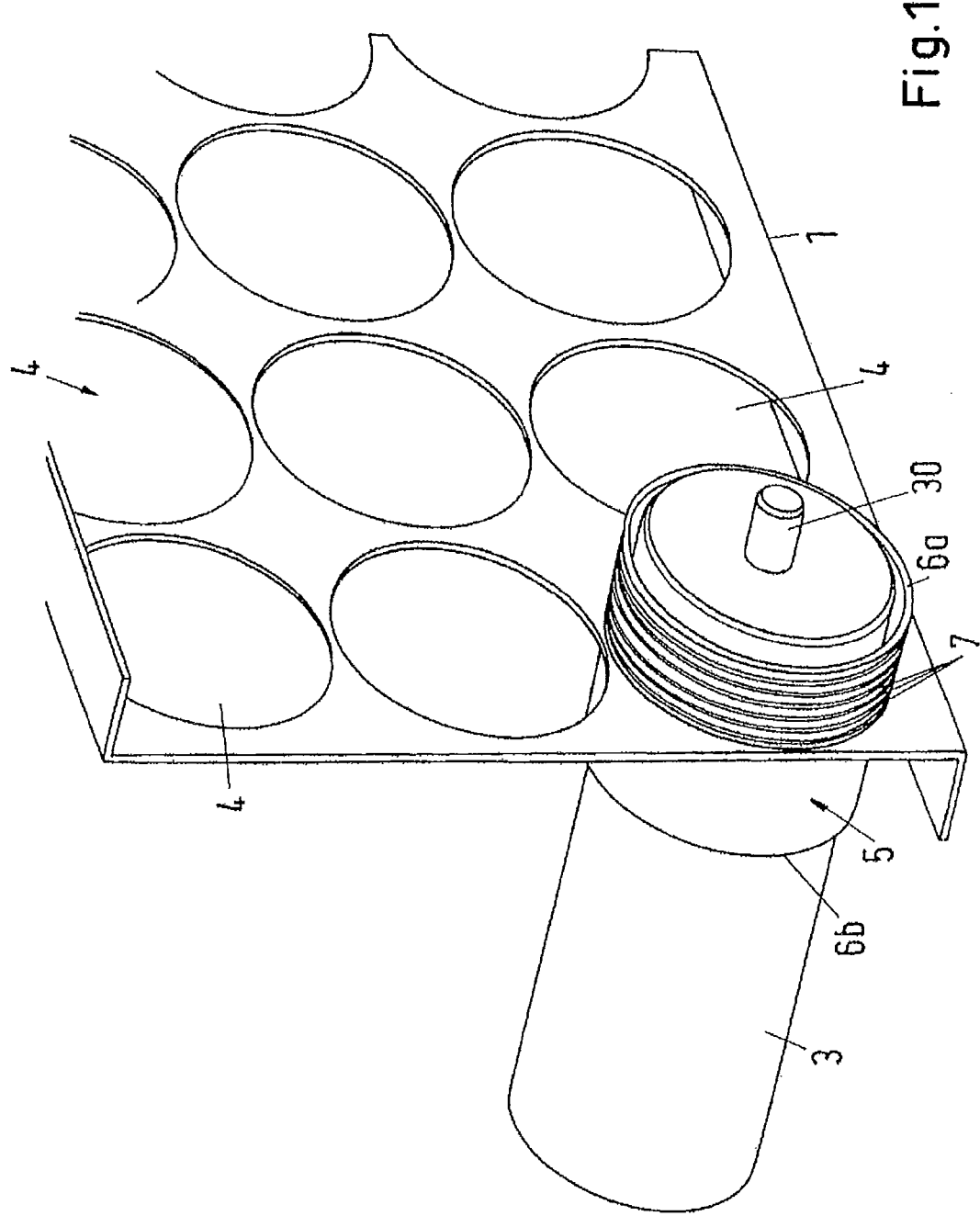
FIG. 1 shows an initial exemplary embodiment for an arrangement with one carrier, one bearing ring and one capacitor assembly.

FIG. 1 shows an initial embodiment of an arrangement with a capacitor assembly 3, a bearing ring 5 and a carrier 1. The carrier 1, which is not shown completely in FIG. 1, has a plurality of circular through-passages 4 that are arranged in rows and columns next to one another. A bearing ring 5, preferably made of electrically insulating material, is arranged in one of these through-passages 4, namely the bottom left through-passage 4 shown in FIG. 1, so that the bearing ring 5 extends through the through-passage 4 (in the axial direction) wherein one subsection 6a of the bearing ring 5 is located in the illustration in front of the through-passage 4 and an additional subsection 6b is located in the illustration behind the through-passage 4.

Using this bearing ring 5, one preferred arrangement of bearing rings is described that could also be implemented differently. The bearing ring has on its outside circumference in at least one subsection 6a a plurality of slots 7 located around the circumference. This facilitates the manual installation of the holding connection.

As an alternative or in addition to this, a subsection 6a of the bearing ring 5 is designed so that the subsection 6a cannot be inserted through the through-passage 4 because the diameter of the subsection 6a is greater than the inner diameter of the through-passage 4. It can be seen in FIG. 4 that the material 9 at the end of the subsection 6a defines a contact surface 10 running around the through-passage 4 and making contact with the material of carrier 1 without being present inside the through-passage 4.

Figure 2:
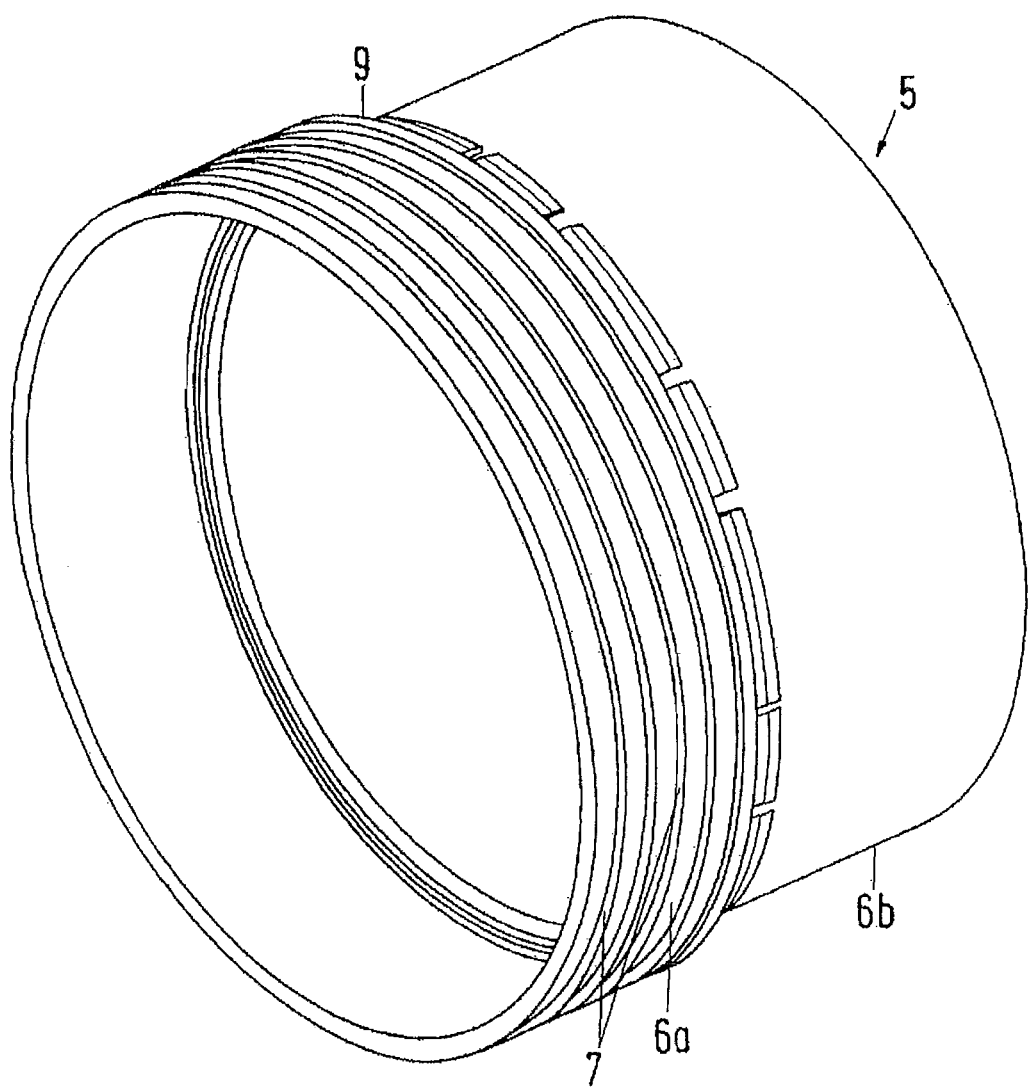
FIG. 2 depicts the bearing ring as per FIG. 1.
Figure 3:
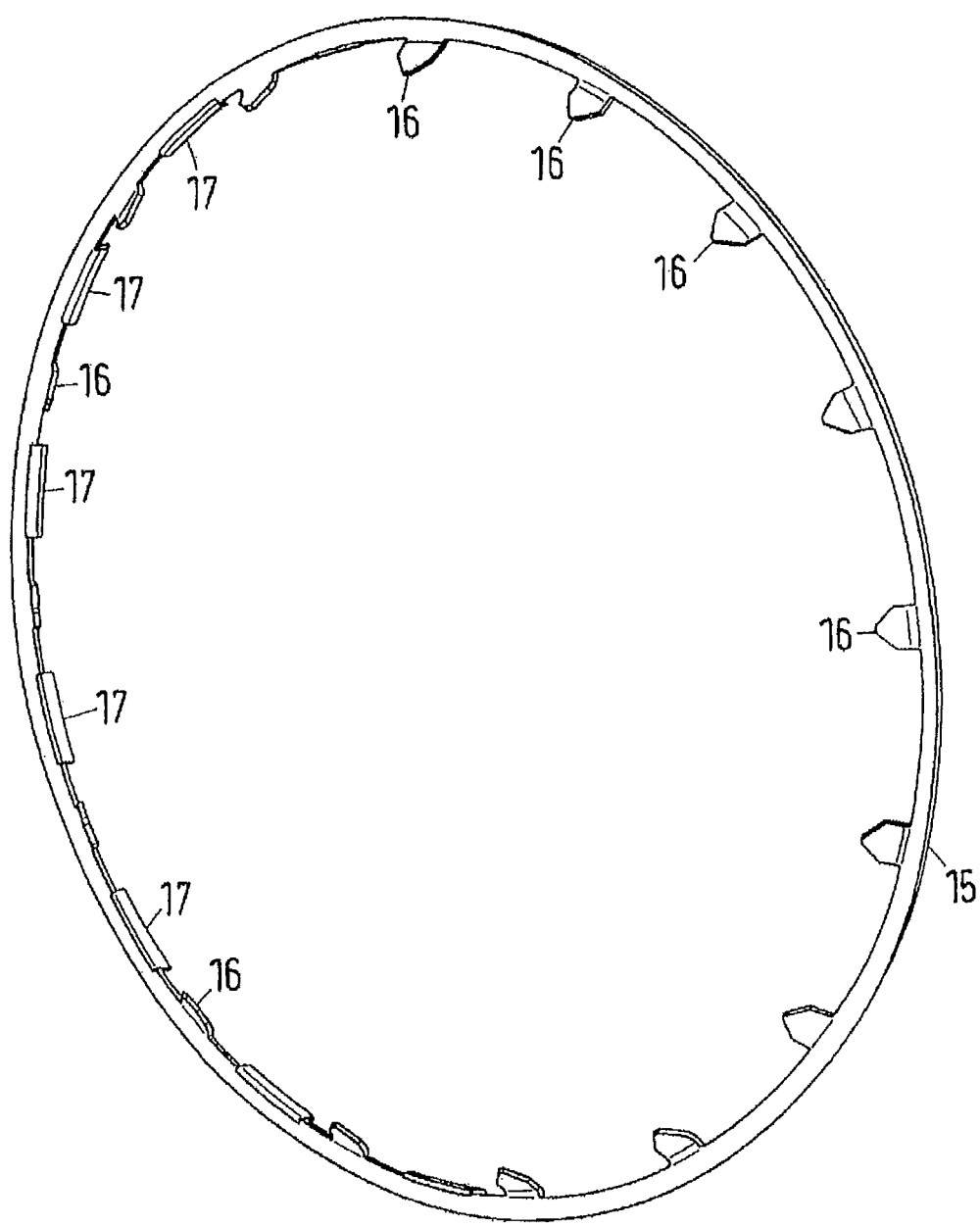
FIG. 3 illustrates a mounting ring of the arrangement as per FIG. 1.

The design of the bearing ring 5 can also be seen in FIG. 2 that depicts the bearing ring 5 alone.

Figure 4:
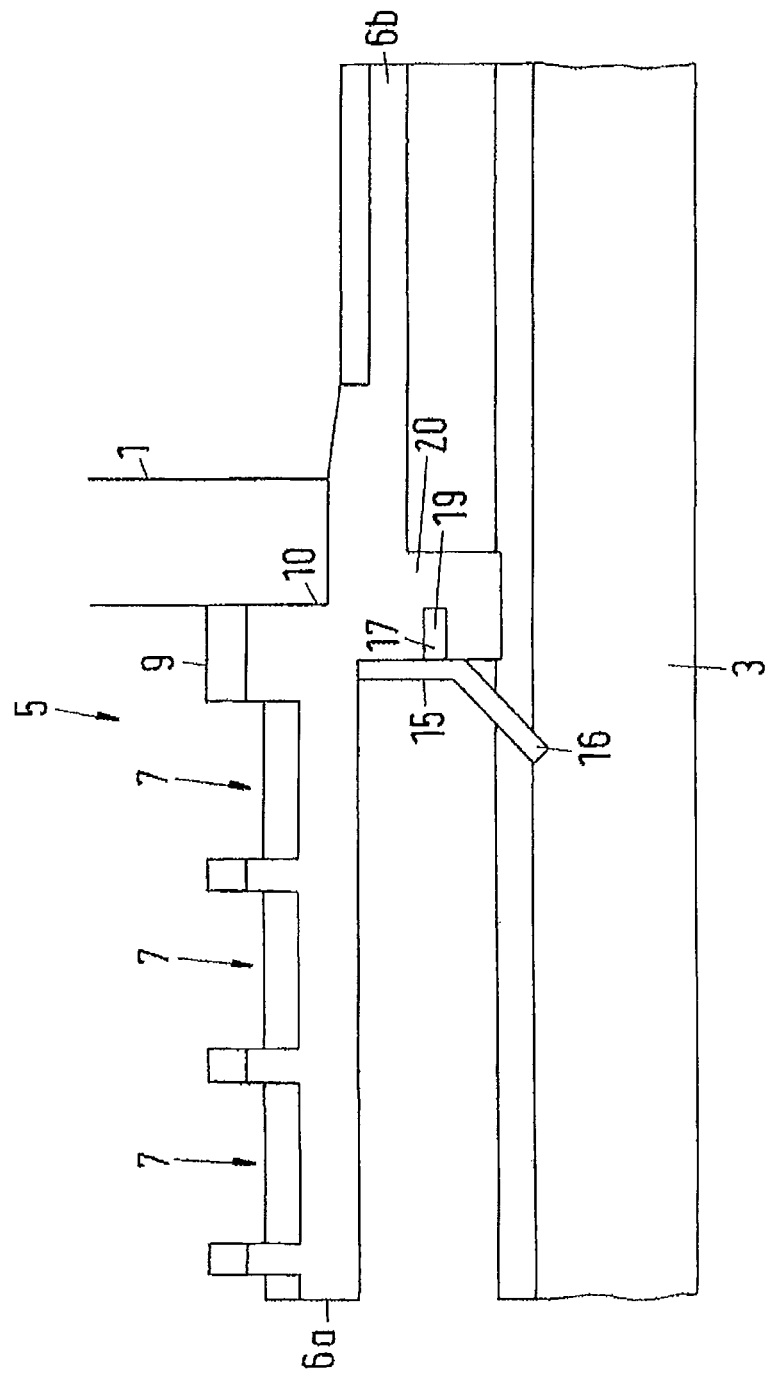
FIG. 4 is a sectional view through a part of the arrangement as per FIG. 1.
Figure 5:
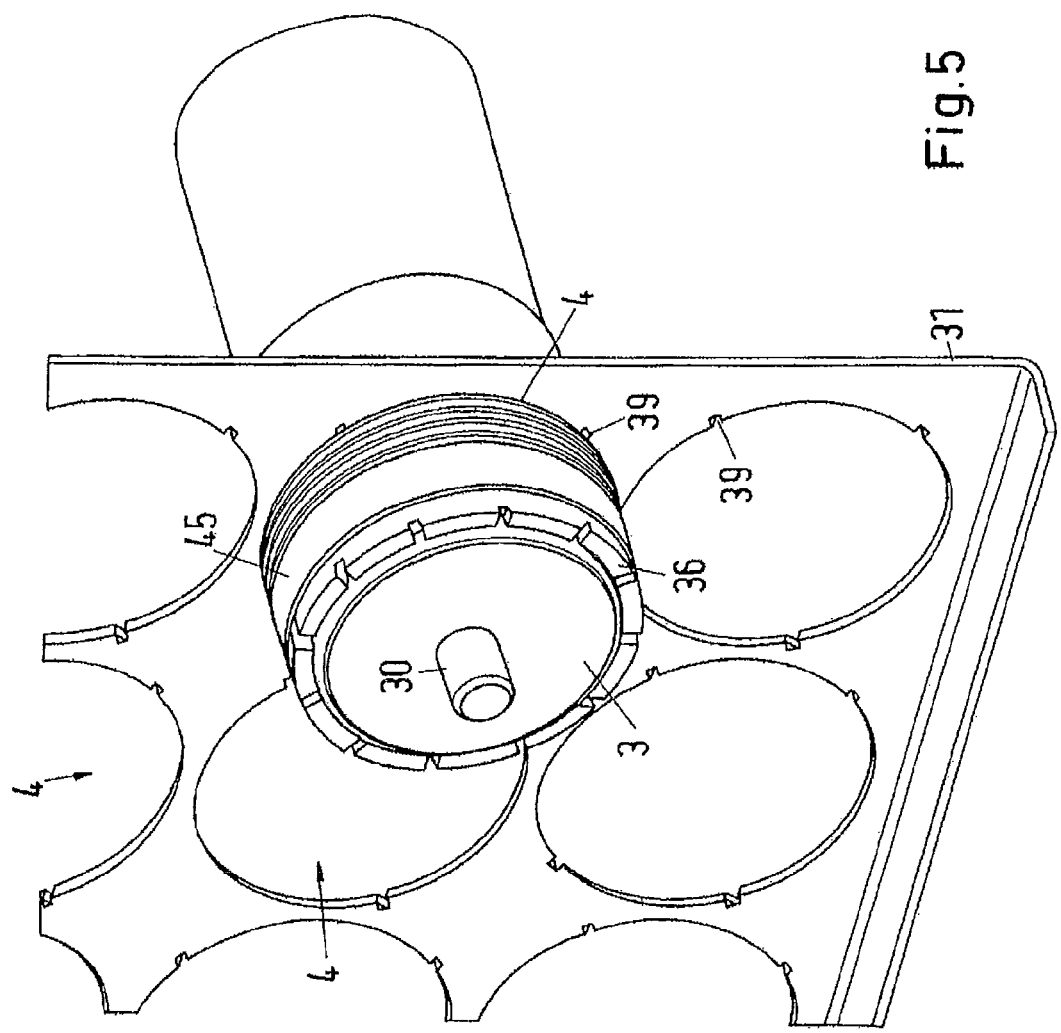
FIG. 5 shows a second arrangement with carriers and a capacitor assembly arranged in the through-passages of the carriers.

The arrangement as per FIG. 1 includes a mounting ring 15, which cannot be seen in FIG. 1, that is made of metal for example and that has a plurality of projections 16 tapering to a point at their free end distributed on the radially inner side of the ring around the inner circumference. In this respect, the projections 16 do not extend only radially inward but also in an axial direction. This weir 15 is pressed into a slot 19 (see FIG. 4) in a section 20 of the bearing ring 5 projecting radially inward by inserting additional projections 17 distributed around the circumference of the weir 15 and extending in the axial direction opposite to the direction that the projections 16 extend. Next, the bearing ring 5 prepared in this way with the weir 15 on the one hand and the assembly 3 to be held on the other hand are moved in an axial direction relative to one another (wherein the assembly 3 is inserted inside the bearing ring 5) such that the projections 16 dig into the surface of the assembly 3 and the desired axial relative position on the external circumference of the assembly 3 as shown in FIG. 4.

Either the bearing ring 5 with the weir 15 it contains is inserted in the through-passage 4 of the carrier 1 before inserting the assembly 3 in the bearing ring 5 or after inserting the assembly 3. The completely installed arrangement can be seen in the illustration of FIG. 4.

Optionally, the subsection 6b that is moved through the through-passage 4 to reach the completely installed position can also have sections projecting outward that, however, still allow the section 6b to move through. For example, these sections may allow slight elastic deformation and/or be moved through the through-passage 4 by scraping under radial pressure so that unintended movement of the bearing ring 5 in the opposite direction is hindered or impossible.

A second embodiment is shown in the FIGS. 5 to 10. The arrangement has one carrier 31. A bearing ring 45 extends through the carrier 31. The held capacitor assembly 3 extends inside the bearing ring 45 through a through-passage 4 in the carrier 31. In the same manner, the assembly 3 can be mounted at its back end in a second carrier.

Figure 6:
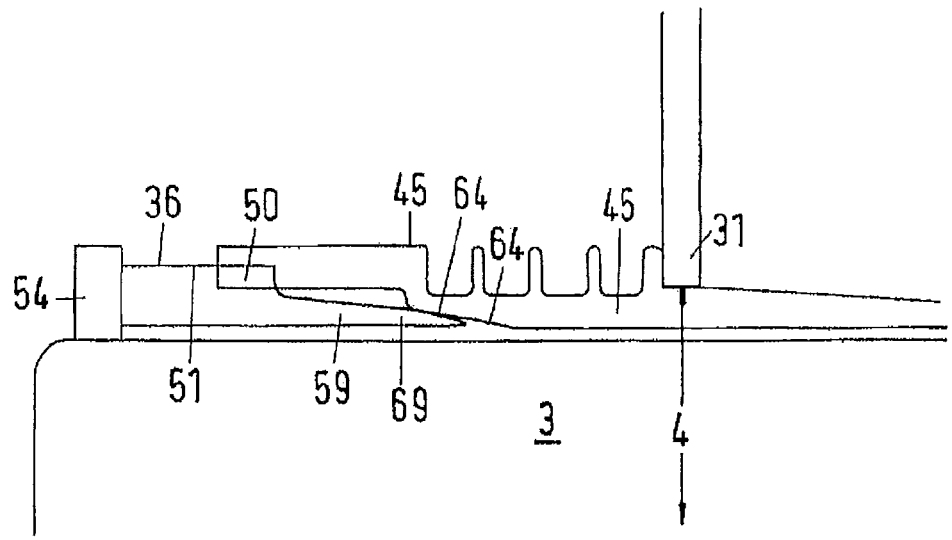
FIG. 6 depicts an axial sectional view through a subsection of the arrangement shown in FIG. 5 wherein the figure represents a state prior to generating a clamping action by way of the axial motion of a clamp ring.
Figure 7:
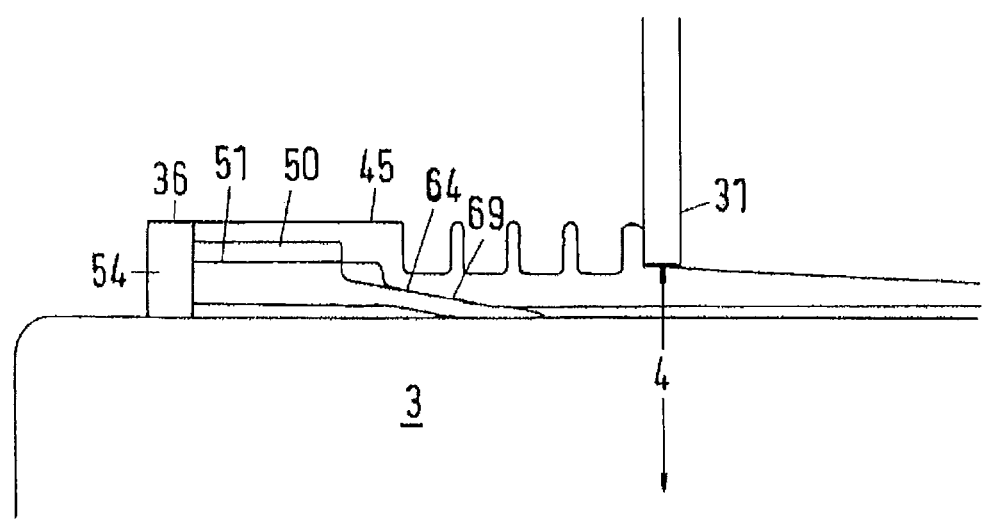
FIG. 7 shows a sectional view as in FIG. 6 wherein the figure, however, represents the finished installation state of the capacitor assembly in the through-passage.

A clamp ring 36 is provided in the through-passage 4 for the secure and permanent mounting of the assembly 3 but this ring (as shown in FIGS. 6 and 7) does not extend into the through-passage 4. Despite this, when installed, it generates a clamping action, that is, forces that act particularly in the radial direction and that hold the assembly 3 to the carrier 31 by means of the clamping action. In this process, the clamping force is transferred from the radial outside to the radial inside first from the carrier to the bearing ring 45, then from this ring to the clamp ring 36 and then from this ring to the outer surface on the circumference of the assembly 3. A clamping force is not transferred directly from the bearing ring 45 to the assembly 3.

Figure 8:
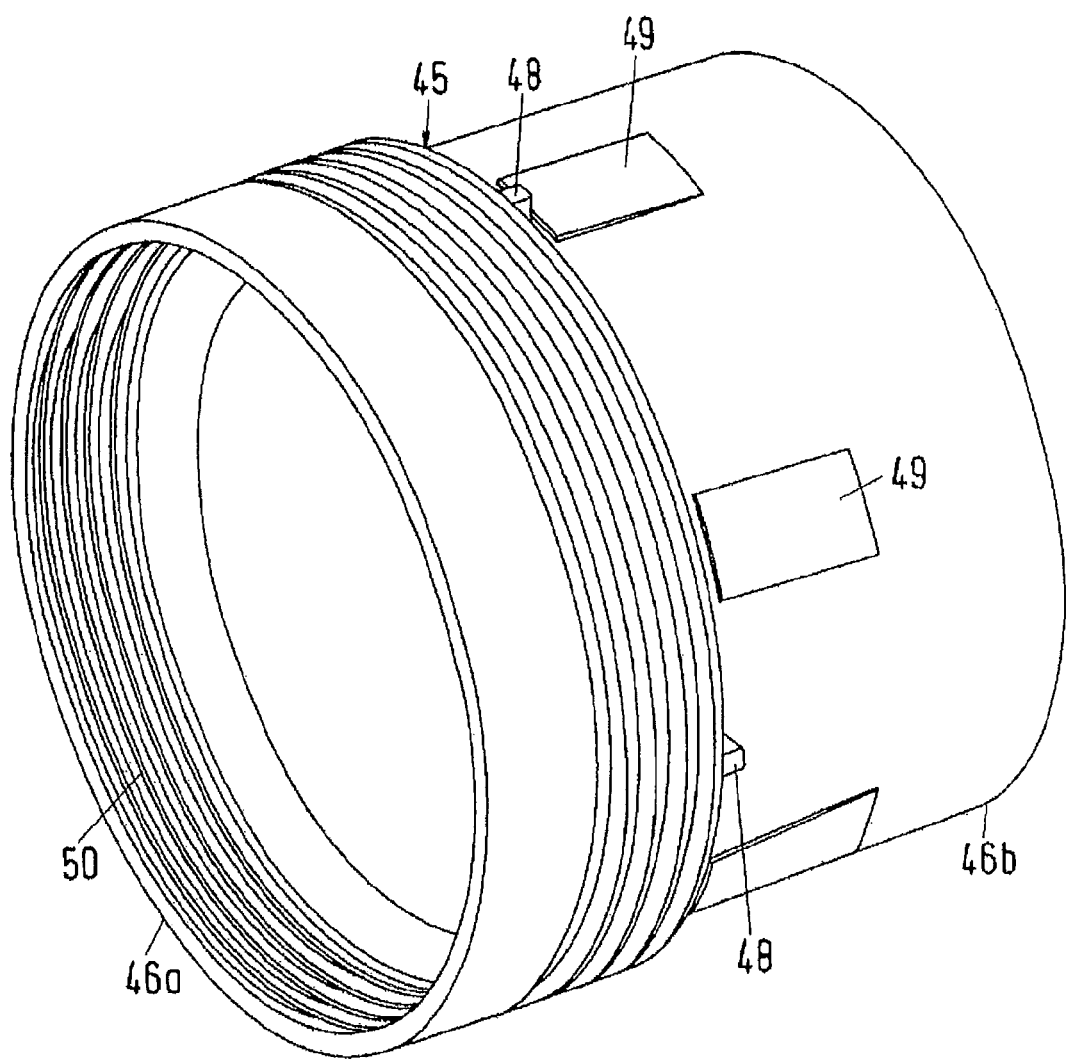
FIG. 8 shows a bearing ring of the arrangement depicted in FIG. 5.

FIG. 8 depicts an exemplary embodiment of a bearing ring 45 that, with regard to the shape of the outer circumference, may be designed like the bearing ring 5 as per FIG. 2. Particularly, the bearing ring may have a first section 46a and a second section 46b wherein only the second section 46b, but not the first section 46a, can be inserted through the through-passage 4 of the carrier 31. Even more characteristics described using FIG. 2 or the description of the bearing ring 5 may be present either individually or in any combination with the bearing ring as per FIG. 8, too. As shown in FIG. 8, the exterior design, that is, the design on the outside circumference of the bearing ring 45 may deviate from the design of the bearing ring 5. In particular, this bearing ring has engaging members 48 on the transition section between the first section 46a and the second section 46b that project in an axial direction from the first section 46a. Two of these are visible in FIG. 8. For example, two additional engaging members are located at the same angular intervals around the longitudinal axis on the outer circumference of the bearing ring 45. The quantity of such projections, however, is not limited to four. Rather, one single such projection is sufficient in principle. However, a plurality of such projections may also be provided at different angular intervals. In each case, the inside edge of the through-passages or at least one through-passage of the carrier 31 (as indicated, for example, by the reference number 39 on carrier 31 in FIG. 5) has at least one corresponding notch so that all projections on the bearing ring can fit into one of the notches 39 and, in this way, prevent unintended rotation of the bearing ring about the longitudinal axis running in the axial direction.

Similar to the bearing ring 5 as per FIG. 2, sections 49 projecting radially outward may be formed on the outer circumference of the second section 46b, these sections, for example directed in the axial direction to the first section 46a, rising from the level of the outer circumference 46b and having an edge extending in the radial direction on their end adjacent to the first section 46a. In this respect, the distance of the edge from the first section 46a is preferably as large as the thickness of the through-passage in the carrier 31 in the axial direction. In this way, the bearing ring 45, with the free end of the second section 46b in front, can be inserted through the through-passage 4 until the face area of the first section 46a makes contact with the material of the carrier 31. In this case, the projection 49 with its edge prevents the bearing ring 45 from being unintentionally removed from the through-passage again or from moving in an axial direction within the through-passage.

Another characteristic also explained using the exemplary embodiment as per FIG. 8 just like the other characteristics described before but also present in other embodiments individually or in combination with other characteristics is an internal thread in the portion of the first section 46a extending from the free end of the bearing ring 45 in the direction of the second section 46b. The internal thread is identified in FIG. 8 by the reference number 50. Corresponding to the internal thread, the clamp ring 36 shown in FIG. 9 has an external thread on its outer circumference. However, in the exemplary embodiment shown in FIG. 9, the external thread 51 does not extend to the free end of the clamp ring 36 in the axial direction. Rather, the clamp ring 36 has a plurality of ring-shaped segments 54 on this free end that are each separated from the adjacent segments 54 by a notch 55. As shown in FIG. 10, one projection 59 of an assembly tool 58 can be inserted into each of these notches 55. The assembly tool 58 is designed to be circular and has a through-passage 61 in its center area wherein the through-passage 61 is formed by a hexagonal-shaped material to allow, for example, the placement of a wrench. If the assembly tool is used, a contact pin 30 projecting in an axial direction (also see FIG. 1, FIG. 5 and FIG. 10) extends at least into the through-passage 61. This contact pin 30 of the capacitor assembly 3 serves as the electrical connection for the assembly 3.

Using the assembly tool 58, the clamp ring 36 can be screwed into the bearing ring 45 in an axial direction whereby members 69, located on the front end in the axial direction facing the rear end in the axial direction with the segments 54, said members being tongue-shaped, i.e., running to a point (as shown in FIGS. 6 and 7), are forced between the material of the bearing ring 45 and the assembly 3, generating the desired clamping action in this manner.

Figure 9:
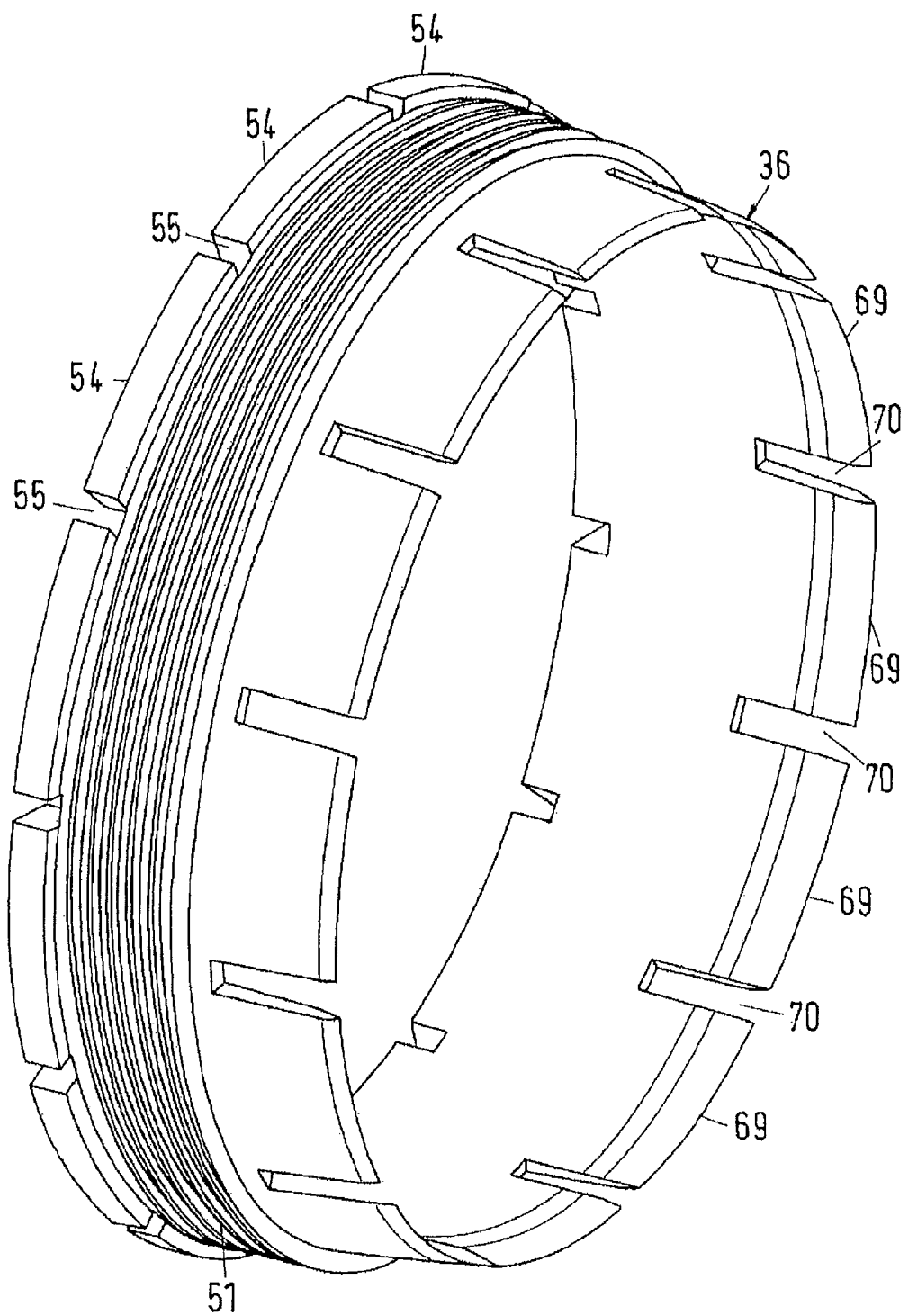
FIG. 9 shows a clamp ring of the arrangement depicted in FIG. 5.
Figure 10:
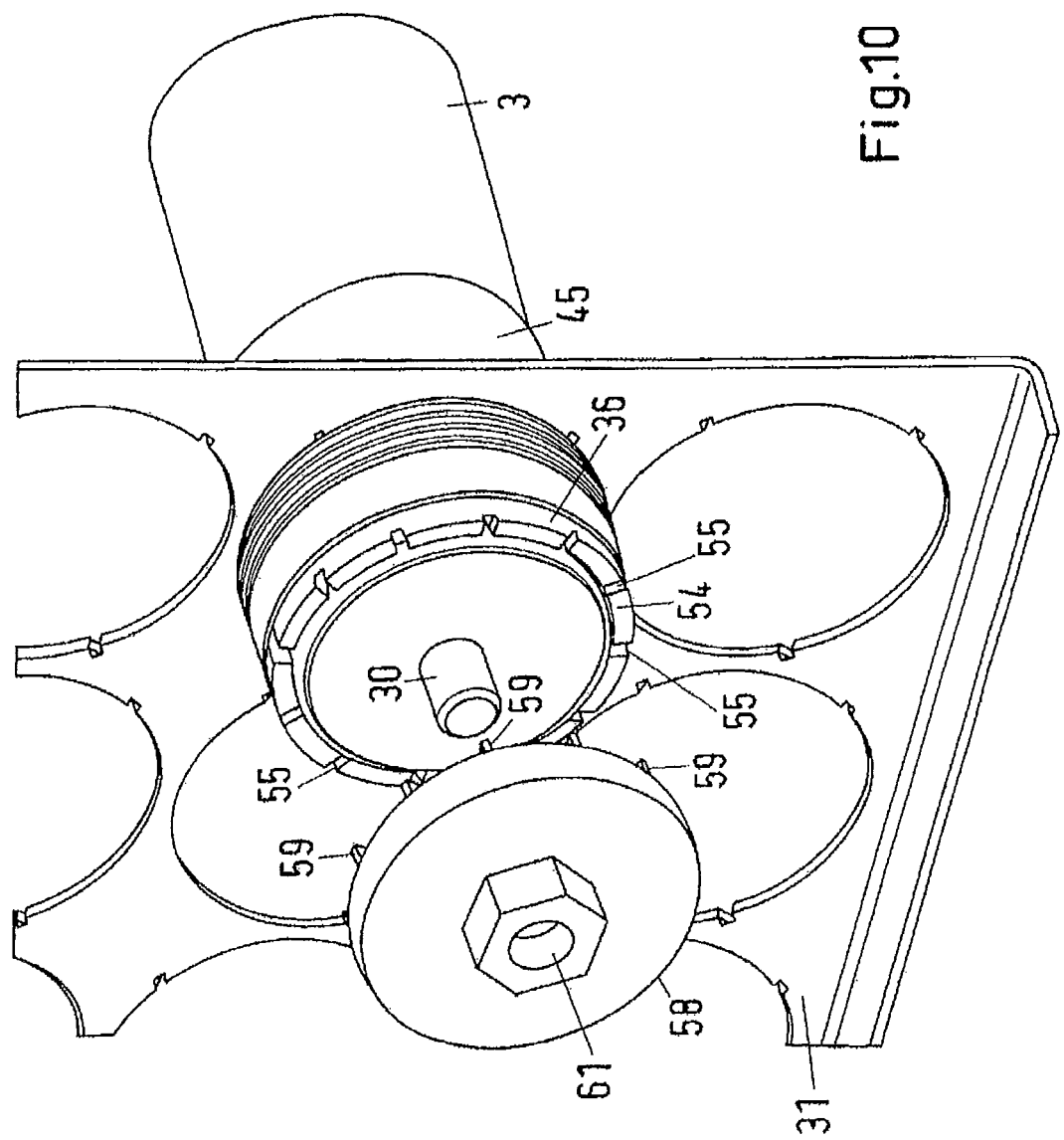
FIG. 10 depicts a subsection of the arrangement illustrated in FIG. 5 with a ring-shaped tool for producing a screwing motion.

In general, not just in the embodiment of the clamp ring shown in FIGS. 6, 7 and 9, a clamp ring may have at its front end in the axial direction at least one section that tapers in the direction of the free end, in particular, tapers such that the thickness of the free end measured in the radial direction decreases. Such a tongue-like design allows generation of the desired clamping action in a simple way.

Optionally and, for example, as shown in the exemplary embodiment as per FIGS. 6 and 7, the bearing ring can have on its inner circumference a surface section running in an axial longitudinal sectional view obliquely from radially outside to radially inside and, the same time, in the axial direction, the tongue-like free end of the clamp ring moving along this section during its axial motion. Such a beveled surface section is identified in FIGS. 6 and 7, for example, using the identification number 64. In the completely installed position shown in FIG. 7, the free end of the clamp ring 52 even extends beyond the beveled section of the bearing ring 45.

In the exemplary embodiment shown in FIG. 9, the tongue-like members 69 are distributed uniformly around the circumference and are in each case separated from one another by a notch 70 around the circumference. In particular, if the plastic material used, for example, undergoes plastic deformation due to the clamping pressure, the notches 70 may be eliminated.

Figure 11:
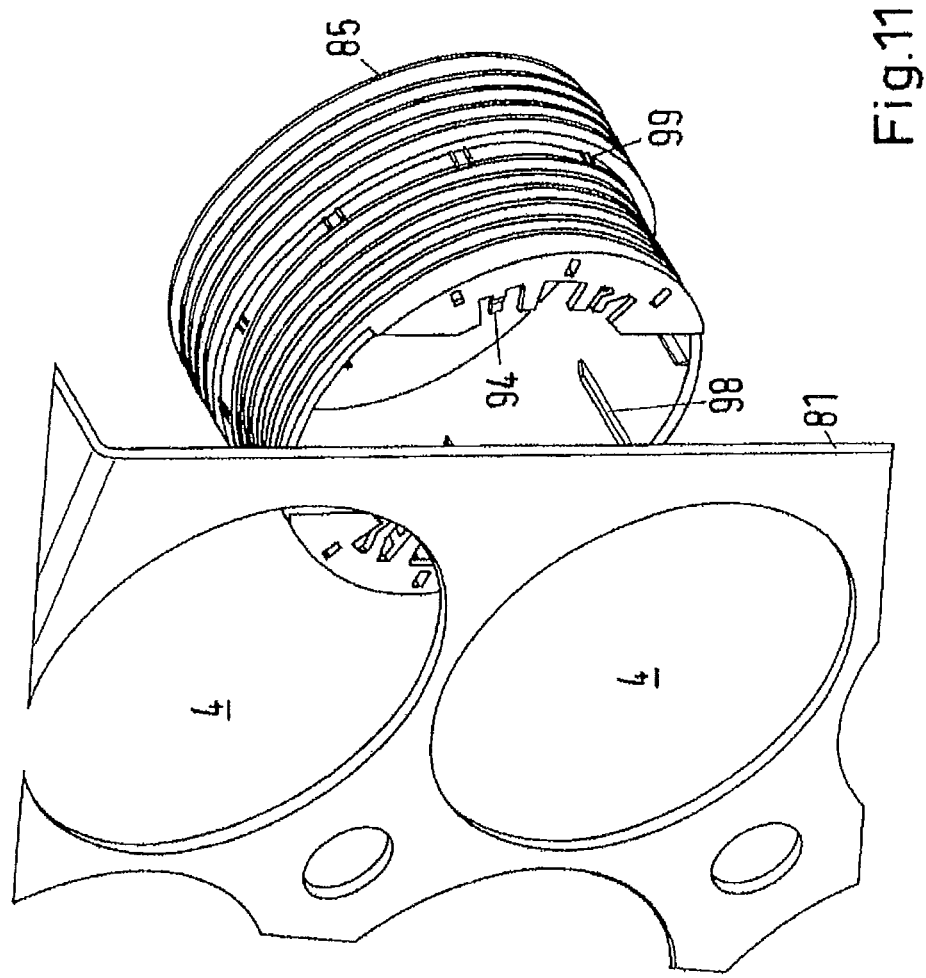
FIG. 11 is a third exemplary embodiment of an arrangement with one bearing ring and one carrier.
Figure 12:
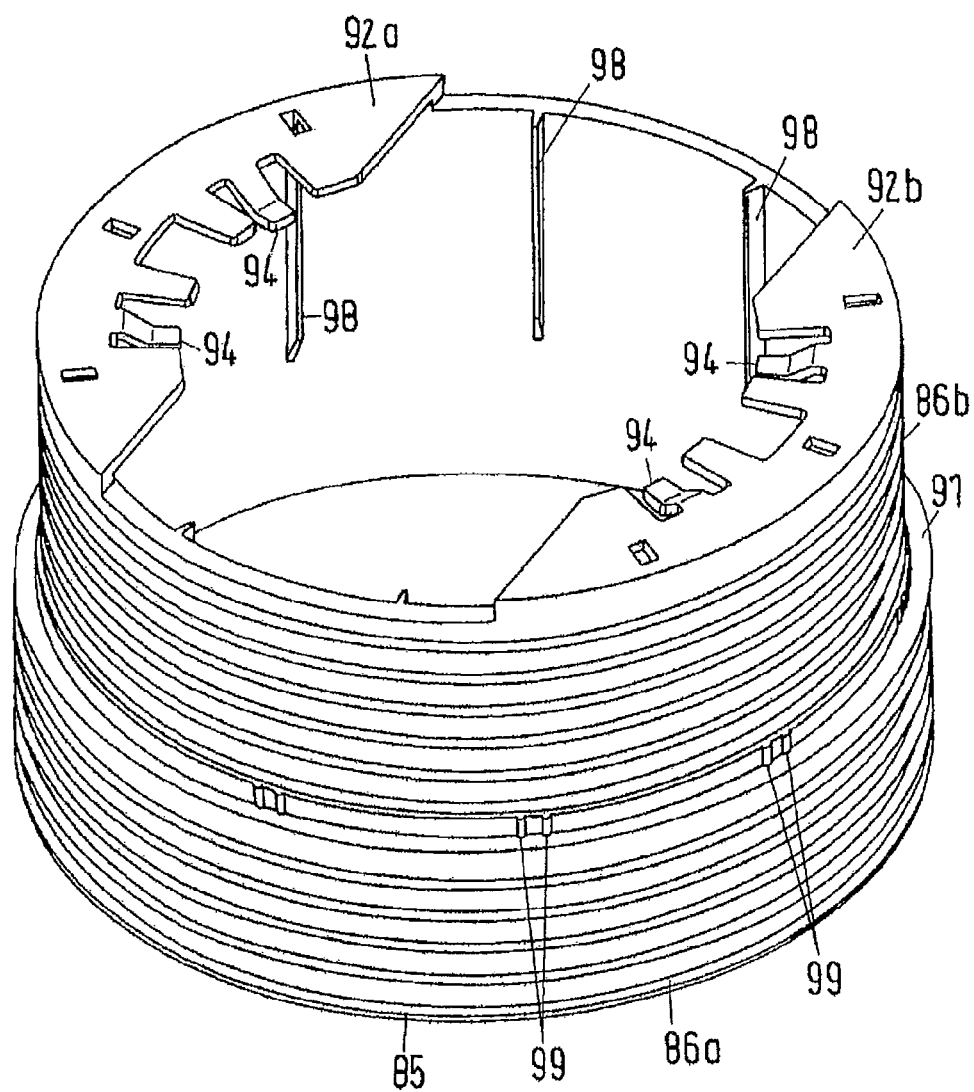
FIG. 12 shows the bearing ring of the arrangement in FIG. 11.

Another embodiment of a bearing ring and a corresponding arrangement are now described using FIGS. 11 and 12. The bearing ring 85 has two areas 86a, 86b located one behind the other in the axial direction. The area 86b of the bearing ring is inserted in the axial direction through the corresponding through-passage 4 of a carrier 81 until an abutment surface 91 of the first area 86a contacts the material of the carrier 81.

As can easily be seen particularly in FIG. 12, the bearing ring 85 has on its inner circumference a plurality of sections 98 projecting linearly in the axial direction. The ends lying inside in the radial direction of these sections 98 are positioned such that a capacitor assembly 3 held by the bearing ring 85 is held by the clamping action of the sections 98 (also see FIG. 16).

In addition, the section 86b immediately in front of the abutment surface 91 around its outer circumference has a plurality of sections 99 projecting radially outward that the bearing ring 85 uses for support by creating a clamping action on the inner edge of a through-passage 4 of the carrier 81 when the bearing ring is installed in the through-passage 4. Both the material of the sections 99 and of the sections 98 may undergo elastic deformation during the creation of the clamping action.

On its free end, the section 86b has sections 92a, 92b running radially inward. In the exemplary embodiment, two such sections 92 are formed facing each other on opposite sides in the radial direction. The sections 92 prevent a capacitor mounted in the bearing ring 85 from escaping from the free end of the second section 86b.

Figure 15:
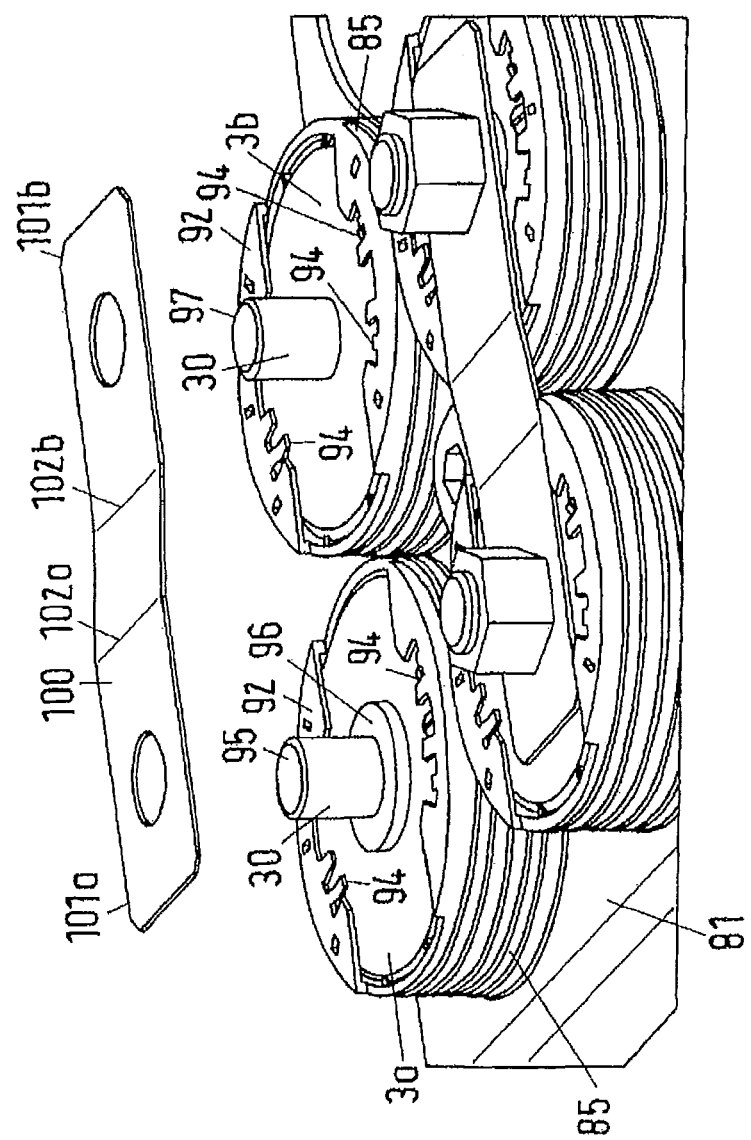
FIG. 15 is a subsection of the arrangement as per FIG. 14 wherein, however, the electrical connecting member for connecting two capacitor assemblies is not yet in contact with the capacitor assemblies.

In a particular embodiment of the sections 92, at least one section 92 has a projection 94 on its radially inward edge and this section can move in the axial direction if an appropriate pressing force is applied by the mounted capacitor assembly on the projection 94. In this respect, the free end of the projection 94 is not under stress if no axial force is being exerted on it in an axial position in front of (in the illustration of FIG. 12, below) the section 92. For this reason, the capacitor assembly, if it cannot exert the force required to deform the projection 94 or if it can only exert part of this force, can touch only the projection 94 but not the section 92. Depending on the axial force, the capacitor assemblies may be mounted in a different axial position in the bearing ring 85. For example, FIG. 15 shows a capacitor assembly 3a on the left that also makes contact with the section 92 while a capacitor assembly 3b is shown on the right in FIG. 15 that only makes contact with the projections 94 but not the section 92. In this way, it is possible to implement reliable reverse voltage protection (that is, protection against connecting the incorrect electrical connections of different capacitor assemblies). For example, the connector 30a of the capacitor assembly 3a is equipped with a projecting contact pin as well as a ring-shaped section 96 having a larger outer diameter than the contact pin 95. This ring 96 indicates that this involves the terminal post of the first type (for example, the positive post).

On the other hand, the terminal post 97 of the capacitor shown on the right in FIG. 15 does not have such an additional ring. An electrical terminal post of the other type (for example, the negative post) is identified in this way.

Figure 14:
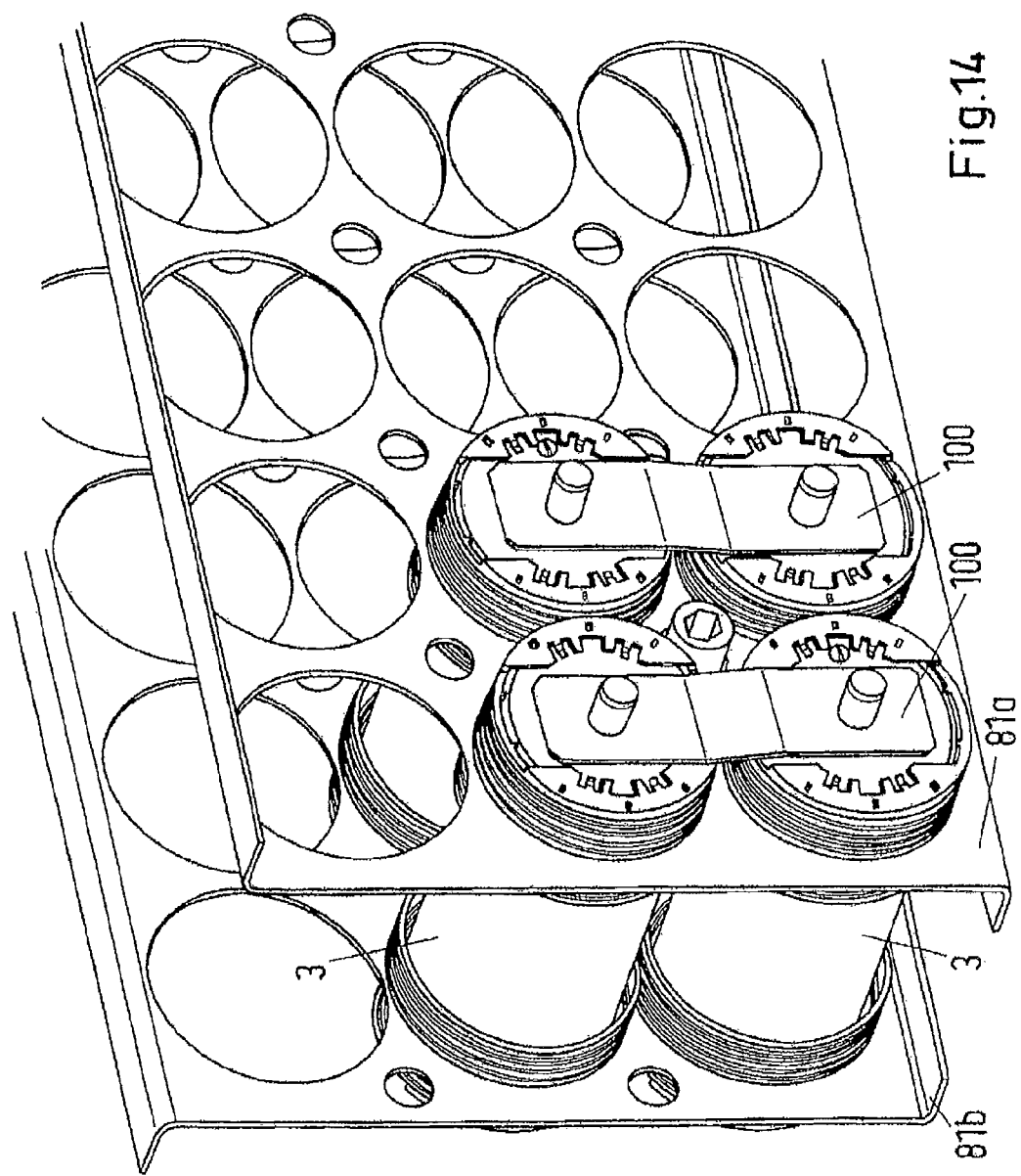
FIG. 14 shows an arrangement with a plurality of capacitor assemblies that are electrically connected to one another.

For example, the capacitors 3a, 3b are to be connected in series. To do this, the connecting member 100 illustrated above in FIG. 15 is used and this member has one through-passage for each of the contact pins 95, 97. For example, FIG. 14 shows the installed state. As the front, free end of the ring-shaped section 96 is located at a different axial position (higher, in FIG. 15) than the front surface of the capacitor 3b, the connecting member 100 has two bends in its central area along its length so that while both ends 101a, 101b run parallel to one another but are not in the same plane.

The bends are identified by the reference numbers 102a, 102b. This design of the connecting member 100 also contributes to reverse voltage protection. If the two capacitor assemblies to be connected in series were positioned with the same post next to one another (for example, the positive post) differently than shown in FIG. 15, this situation would be obvious because both posts would have either one ring-shaped section 96 or none at all. When fastening the connecting member 100 with the bent center section to the contact pins (for example, by screwing nuts onto the outer thread of the contact pins), the surface of the connecting member 100 would not make contact with as complete a surface as possible either on the front end of the ring-shaped sections or the front end of the assembly housing and would thus be easy to recognize. Expressed in other terms, the design with two bends for the connecting members to the axial ends of the assemblies with the opposite circumstances would lead to the situation that the assemblies are brought into an appropriate axial position because of the fastening of the connecting members to the contact posts. If the assemblies are of incorrect polarity, that is, mounted in an inverted position, the surface of at least one of the contact members would not make as complete a surface contact as possible on one of the assemblies.

It can be seen in FIG. 15 that the sections 92 of the bearing rings 85 extending inward in the radial direction leave some free space open between them over which the connecting member 100 can extend when installed.

Figure 13:
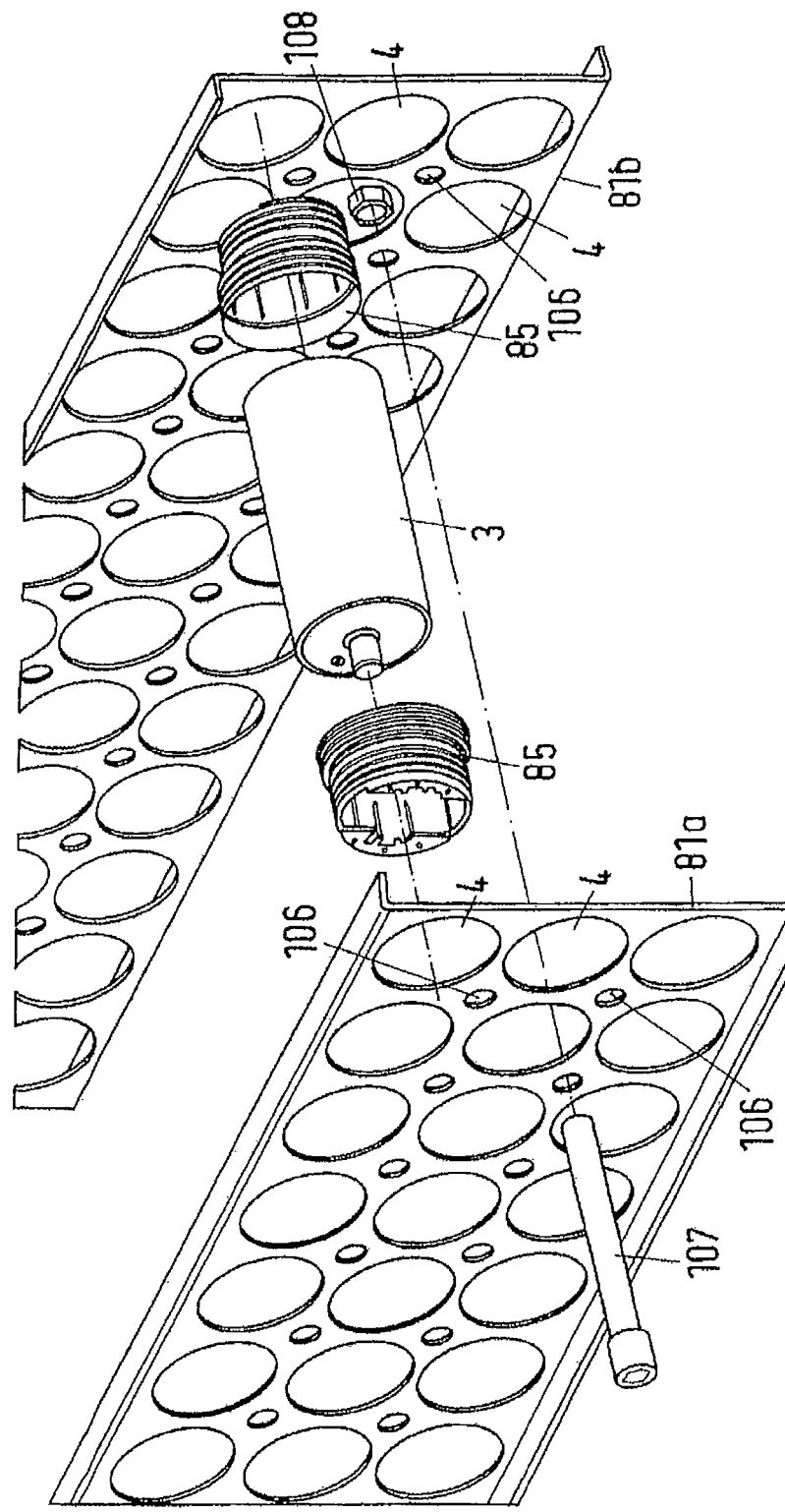
FIG. 13 illustrates a perspective view of the mounting of a capacitor assembly to two carriers, each having a bearing ring.

It can be seen in FIG. 13 how a capacitor assembly 3 with the help of two bearing rings, for example, of the type of bearing rings that were described using FIG. 11 and FIG. 12, and with the help of two carriers 81a, 81b can be held securely. The carriers 81 have additional through-passages 106 between the through-passages 4 for installing the capacitor assemblies. For example, using stud bolts 107 and nuts 108, the carriers 81a, 81b are screwed to one another so that the assemblies cannot escape unintentionally from the bearing rings 85.

FIG. 14 shows the installed state with a total of four installed capacitor assemblies 3 of which the assemblies above one another are connected electrically to one another on the axial side at the front by means of a connecting member 100 with two bends. In this figure, the connecting members 100 have not yet been screwed tight or fastened in another manner to the front contact surfaces of the assemblies 3.

Figure 16:
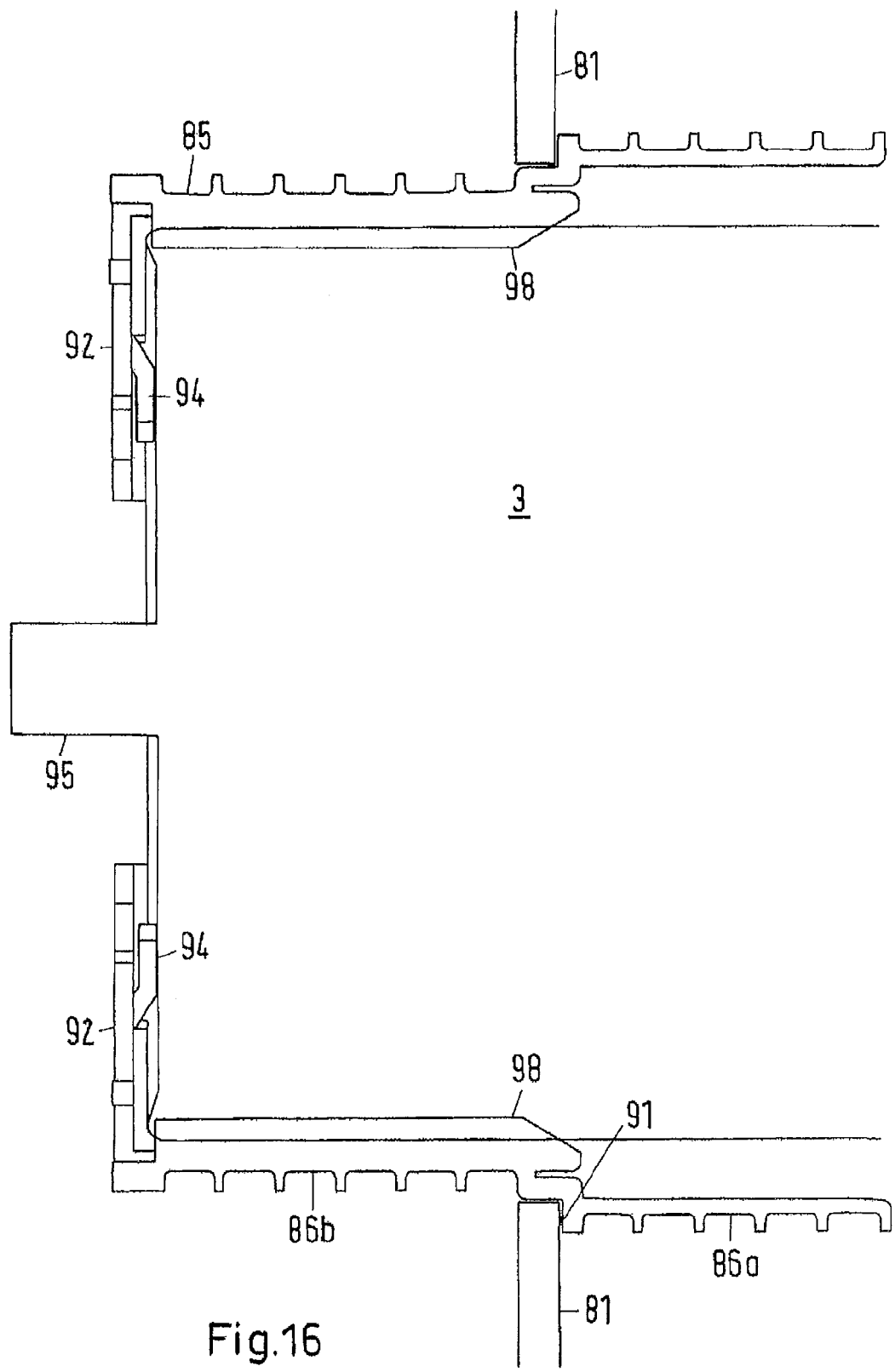
FIG. 16 illustrates an axial longitudinal view through a capacitor assembly and a bearing ring of the third exemplary embodiment.

FIG. 16 shows an axial longitudinal view through an axial end section of a capacitor assembly 3 and a bearing ring 85 arranged in this end section. On the left in the figure can be seen the section 92 extending inward in the radial direction with the projection 94 being slightly offset in the axial direction. In general, it is valid that the projections 94 make it possible for the capacitor assembly to be shifted slightly in the axial direction, in particular if one or more such projections are located on both opposite axial ends of the assembly. For example, the shift in the axial direction, as mentioned, is effected by the connecting members 100 when these are fastened to the contact pins.

The invention claimed is:

1. An arrangement for holding a plurality of electric capacitor assemblies, the arrangement comprising:
a carrier with a through-passage for inserting one of the assemblies,
at least one bearing ring for mounting one assembly,
wherein the bearing ring is matched to the dimensions of the through-passage and of the assembly so that the assembly, when extended through the through-passage, makes contact with an inside edge of the through-passage by way of the bearing ring but is not directly in contact with the inside edge of the through-passage, and
wherein the arrangement has a clamp ring that, when the assembly is installed, extends circumferentially between an outer circumference of the assembly and material of the carrier in such a way that the assembly, the clamp ring and the bearing ring are held on the inner edge of the through-passage by clamping action,
wherein an axial direction is defined by the through-passage and extends from one side of the carrier through the through-passage to an opposite side of the carrier wherein the arrangement is designed such that the clamp ring is to be moved in the axial direction to generate the clamping action to install the assembly, and
wherein the clamp ring has a first thread and the bearing ring has a second thread that work together in such a way that, using a screwing motion of the bearing ring and/or of the clamp ring, the clamp ring is moved in the axial direction and, in this way, is brought into an axial position in which the clamp ring generates the clamping action.

2. The arrangement according to claim 1, wherein the bearing ring is made of an electrically insulating material.

3. The arrangement according to claim 1, wherein the bearing ring extends around the outer circumference of the assembly on the inner edge of the through-passage.

4. The arrangement according to claim 1, wherein the carrier is made of an electrically insulating material.

5. The arrangement according to claim 1, comprising a plurality of through-passages, wherein the carrier has a plate-shaped section in which the through-passages are arranged next to one another.

6. The arrangement according to claim 1, wherein at least one recess extending in a radial direction is arranged on the inside edge of the through-passage wherein the bearing ring has a projection extending outward in the radial direction and wherein the projection engages in the recess in such a way that the bearing ring is secured against a rotational movement in a circumferential direction of the edge of the through-passage.

7. The arrangement according to claim 1, wherein an axial direction is defined by the through-passage and extends from one side of the carrier through the through-passage to an opposite side of the carrier wherein the arrangement has a second carrier with at least one second through-passage for inserting one of the assemblies and wherein the assembly, when installed, extends through one of the through-passages of the first carrier and, in a section located at some distance in the axial direction from the first carrier, extends through the second through-passage and is held in the second through-passage by means of a second bearing ring.

8. An energy storage device with the arrangement according to claim 1, wherein the capacitor assemblies are electrically connected to one another.

9. A method for holding a plurality of electric capacitor assemblies comprising:
installing the assemblies, wherein one assembly, in each case, is inserted into a through-passage of a carrier having a plurality of through-passages such that the assembly extends through the through-passage,
before, during and/or after insertion of the assembly in the through-passage, a bearing ring is inserted into the through-passage so that it is arranged between an outside circumference of the assembly and an inside edge of the through-passage and holds the assembly to the carrier as soon as installation has been completed,
so that the assembly makes contact with the inside edge of the through-passage by way of the bearing ring but is not directly in contact with the inside edge of the through-passage,
wherein the assembly is installed to the carrier using a clamp ring that extends, when the assembly is installed, circumferentially between the outer circumference of the assembly and material of the carrier such that the assembly, the clamp ring and the bearing ring are held on the inner edge of the through-passage by clamping action,
wherein an axial direction is defined by the through-passage and extends from one side of the carrier through the through-passage to an opposite side of the carrier wherein the clamp ring is moved in the axial direction to generate the clamping action to install the assembly, and
wherein the clamp ring, using a screwing motion of the bearing ring and/or of the clamp ring, is moved in the axial direction and is brought into an axial position in which the clamp ring generates the clamping action.

10. The method according to claim 9, wherein a material that forms the outer circumference of the assembly is electrically insulated against the material of the carrier by the bearing ring.

11. The method according to claim 9, wherein the bearing ring is arranged in the through-passage such that it extends around the outer circumference of the assembly on the inner edge of the through-passage.

12. The method according to claim 9, wherein a plurality of assemblies are mounted next to one another in the carrier in different through-passages of the carrier using a bearing ring in each case.

13. The method according to claim 9, further comprising fastening the assembly in axial sections separated from one another to a carrier by means of a bearing ring.

* * * * *

UNITED STATES PATENT AND TRADEMARK OFFICE
CERTIFICATE OF CORRECTION

PATENT NO. : 8,654,545 B2  Page 1 of 1
APPLICATION NO. : 13/063632
DATED : February 18, 2014
INVENTOR(S) : Manfred Zengerle et al.

It is certified that error appears in the above-identified patent and that said Letters Patent is hereby corrected as shown below:

On the Title Page, Column 2, Item (57) Abstract, Line 7, after "assembly" insert -- , --

Signed and Sealed this
Third Day of June, 2014

Michelle K. Lee
*Deputy Director of the United States Patent and Trademark Office*